(12) United States Patent  
Imura et al.

(10) Patent No.: US 11,890,938 B2  
(45) Date of Patent: Feb. 6, 2024

(54) INSTALLATION ARRANGEMENT FOR DRIVE MOTOR AND BATTERY IN VEHICLE

(71) Applicant: Nissan Motor Co., Ltd., Yokohama (JP)

(72) Inventors: Ryota Imura, Kanagawa (JP); Kei Nakazato, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 224 days.

(21) Appl. No.: 17/639,356

(22) PCT Filed: Sep. 2, 2019

(86) PCT No.: PCT/JP2019/034411  
§ 371 (c)(1),  
(2) Date: Mar. 1, 2022

(87) PCT Pub. No.: WO2021/044479  
PCT Pub. Date: Mar. 11, 2021

(65) Prior Publication Data  
US 2022/0340000 A1 Oct. 27, 2022

(51) Int. Cl.  
*B60K 6/40* (2007.10)  
*B60K 6/52* (2007.10)  
(Continued)

(52) U.S. Cl.  
CPC .......... *B60K 6/40* (2013.01); *B60K 6/46* (2013.01); *B60K 6/52* (2013.01); *B60K 2001/0438* (2013.01)

(58) Field of Classification Search  
CPC ... B60K 6/40; B60K 6/46; B60K 6/52; B60K 2001/0438  
See application file for complete search history.

(56) References Cited

U.S. PATENT DOCUMENTS

| 8,448,542 B2 | 5/2013 | Nagamori et al. |
| 10,384,524 B2 * | 8/2019 | Spiegel .................... B60K 1/00 |

(Continued)

FOREIGN PATENT DOCUMENTS

| JP | H07-81429 A | 3/1995 |
| JP | 2008-185078 A | 8/2008 |

(Continued)

OTHER PUBLICATIONS

Chinese Office Action dated Nov. 11, 2023 of corresponding Chinese Patent Application No. 201980099948.8.

*Primary Examiner* — John D Walters  
(74) *Attorney, Agent, or Firm* — Global IP Counselors, LLP (57) ABSTRACT

An installation arrangement is provided for a vehicle having a front motor for driving a front wheel, a rear motor for driving a rear wheel, a high-voltage battery that stores electrical power for the motors, and a low-voltage battery that stores electrical power for various units. The installation arrangement is configured such that an intersection of a longitudinal center line and a lateral center line of the vehicle overlaps the high-voltage battery as seen in a plan view. In the front section of the vehicle, the front motor is arranged on one side of the longitudinal center line, and the internal combustion engine is arranged on the other side of the longitudinal center line. In the rear section of the vehicle, the low-voltage battery is arranged on one side of the longitudinal center line, and the rear motor is arranged on the other side of the longitudinal center line.

5 Claims, 6 Drawing Sheets

(51) Int. Cl.
*B60K 6/46* (2007.10)
*B60K 1/04* (2019.01)

(56) References Cited

U.S. PATENT DOCUMENTS

2008/0182712 A1* 7/2008 Kira ................ B60K 17/356
477/7
2012/0174708 A1 7/2012 Nagamori et al.

FOREIGN PATENT DOCUMENTS

| | | |
|---|---|---|
| JP | 2012-165564 A | 8/2012 |
| JP | 2014-061736 A | 4/2014 |
| JP | 2015-61414 A | 3/2015 |
| JP | 2016-83951 A | 5/2016 |
| JP | 2017-97971 A | 6/2017 |
| JP | 2018-42314 A | 3/2018 |
| WO | WO-2008111547 A1 * | 9/2008 ............ B60K 15/04 |
| WO | 2011/083680 A1 | 7/2011 |

\* cited by examiner

FIG. 6

INSTALLATION ARRANGEMENT FOR DRIVE MOTOR AND BATTERY IN VEHICLE

CROSS-REFERENCE TO RELATED APPLICATIONS

This application is a U.S. national stage application of International Application No. PCT/JP2019/034411, filed on Sep. 2, 2019.

BACKGROUND

Technical Field

The present invention relates to an installation arrangement of a front motor for driving the front wheels, a rear motor for driving the rear wheels, an internal combustion engine, a low-voltage battery, and a high-voltage battery that stores electrical power for the motors, on a vehicle.

Background Information

International Publication No. 2011/083680 (Patent Document 1) discloses a vehicle equipped with a front motor for driving the front wheels, a rear motor for driving the rear wheels, an internal combustion engine, and a high-voltage battery that stores electrical power for the motors described above. In Patent Document 1, the vehicle is a hybrid electric vehicle (HEV) equipped with a generator (motor/generator). The generator uses the output of the internal combustion engine to generate power. Although not specified in Patent Document 1, a low-voltage battery that stores the electrical power used by the internal combustion engine and supplemental components is also installed in the vehicle. The front motor and the rear motor described above can also carry out regenerative power generation during deceleration of the vehicle. The electrical power generated by the generator and the electrical power regenerated by the front motor and the rear motor are stored in the high-voltage battery. Further, the motor is driven by means of the electrical power supplied from the high-voltage battery to the front motor and the rear motor, thereby running the vehicle.

SUMMARY

The front motor, the rear motor, the high-voltage battery, and the internal combustion engine described above are heavier units among the various units installed in the vehicle. In the vehicle disclosed in Patent Document 1, a heavy rear motor is installed on the left side of the rear section, so that the weight distribution is uneven. For this reason, it is desirable to improve the weight distribution from the standpoint of vehicle dynamics (handling and stability).

The object of the present invention is to provide an installation arrangement in a vehicle for a drive motor and a battery that can realize excellent weight distribution.

The installation arrangement according to a feature of the present invention comprises a front motor for driving front wheels, a rear motor for driving rear wheels, an internal combustion engine, a high-voltage battery that stores electrical power for the motors described above, and a low-voltage battery that stores electrical power used by various units installed in the vehicle. The following [a]-[c] are satisfied in a plan view of the vehicle. [a] The intersection of the longitudinal center line and the lateral center line of the vehicle overlaps the high-voltage battery. [b] In the front section of the vehicle, the front motor is arranged on one side of the longitudinal center line, and the internal combustion engine is arranged on the other side of the longitudinal center line. [c] In the rear section of the vehicle, the low-voltage battery is arranged on one side of the longitudinal center line, and the rear motor is arranged on the other side of the longitudinal center line.

By means of the installation arrangement according to the feature described above, it is possible to achieve an excellent weight distribution.

BRIEF DESCRIPTION OF THE DRAWINGS

Referring now to the attached drawings which form a part of this original disclosure.

DETAILED DESCRIPTION OF EMBODIMENTS

The installation arrangement according to an embodiment will be described below with reference to the drawings.

Figure 1:
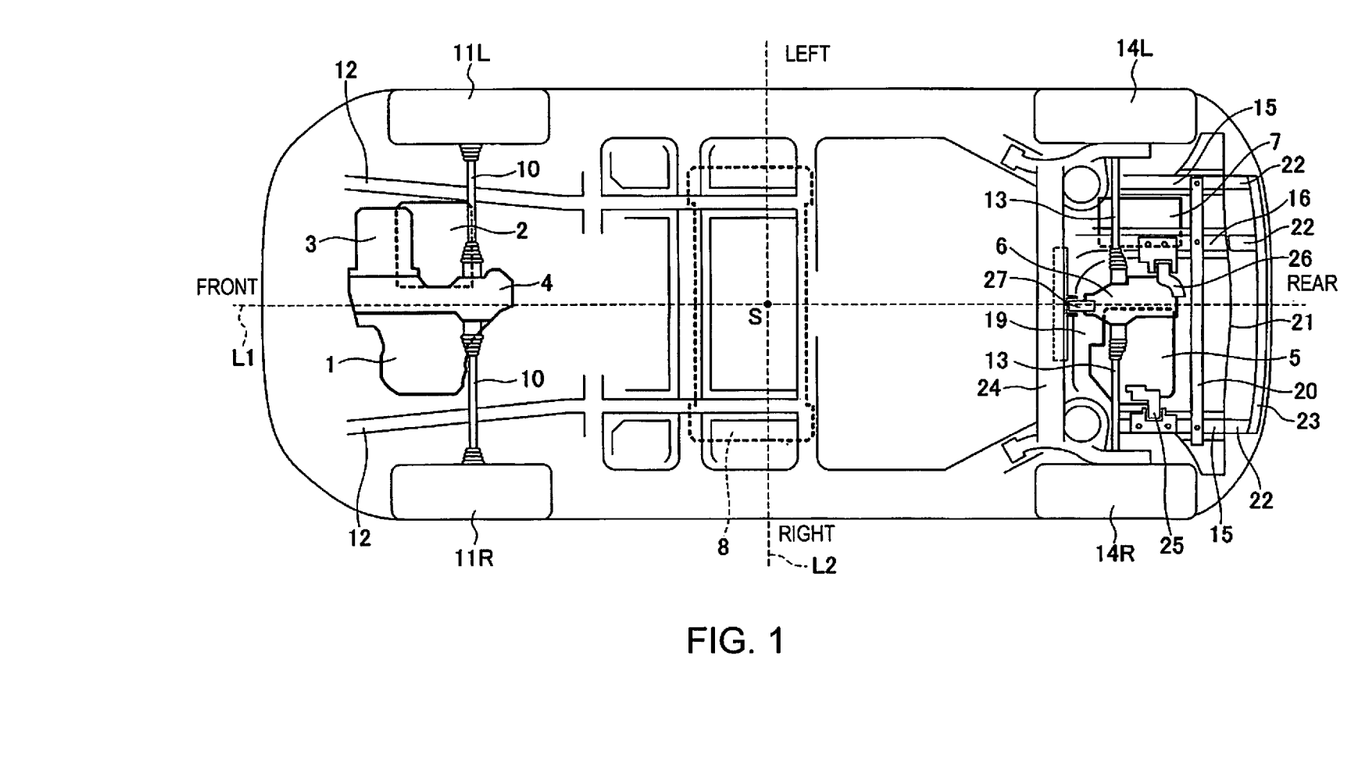
FIG. 1 is a schematic bottom view of a vehicle equipped with an installation arrangement according to an embodiment.

FIG. 1 is a bottom view of a vehicle equipped with the installation arrangement according to the present embodiment. In FIG. 1, several parts, such as the floor panels, have been omitted in order for the arrangement of the units to be easily seen. Several structural members have also been omitted. The left side of FIG. 1 is the front of the vehicle, the right side is the rear of the vehicle, the upper side is the left side of the vehicle, and the lower side is the right side of the vehicle. In FIG. 1, reference symbol L1 indicates a longitudinal center line along the longitudinal direction of the vehicle that passes through the center of the vehicle in the lateral direction. Similarly, reference symbol L2 indicates a lateral center line along the lateral direction that passes through the center in the longitudinal direction. FIG. 1 is a bottom view, but longitudinal center line L1 and lateral center line L2 also can be defined in an overhead plan view of the vehicle. The reference symbol S is the intersection of longitudinal center line L1 and lateral center line L2.

An internal combustion engine 1, a front motor 2, a generator (motor/generator) 3, and a front gearbox 4 are mounted in an engine compartment of the front section of the vehicle. An inverter 30 for the front motor 2 and the generator 3 are also mounted in the engine compartment. The inverter 30 is arranged above both the front motor 2 and the generator 3 (refer to FIGS. 2 and 6). On the other hand, a rear motor 5, a rear gearbox 6, and a low-voltage battery 7 are mounted below a luggage compartment in the rear section of the vehicle. A high-voltage battery 8 is mounted below a seat in a passenger compartment at the center of the vehicle. The output voltage of the high-voltage battery 8 (for example, 100-300V) is higher than the output voltage of the low-voltage battery 7 (for example, 12V). The high-voltage battery 8 may be disposed either above or below the floor panel. More specifically, the heavy high-voltage battery 8 is arranged at the center of the vehicle so as to overlap the intersection S of longitudinal center line L1 and lateral center line L2 in a plan view.

The vehicle according to the present embodiment is a series hybrid electric vehicle (HEV), in which the generator 3 uses the output of the internal combustion engine 1 to generate power. The generator 3 is a three-phase AC generator, and the electrical power generated by the generator 3 is stored in the high-voltage battery 8 via the inverter 30, a DC/DC converter, or the like. The front motor 2 is a three-phase AC motor and is electrically connected to the high-voltage battery 8 via the inverter 30, a DC/DC converter, or the like. The front motor 2 is driven by electrical power from the high-voltage battery 8. The rear motor 5 is also a three-phase AC motor and is electrically connected to the high-voltage battery 8 via an inverter, a DC/DC converter, or the like. An inverter for the rear motor 5 is built into the rear motor 5. The rear motor 5 is also driven by the electrical power from the high-voltage battery 8.

The electrical power generated by the generator 3 can be directly supplied to the front motor 2 and the rear motor 5 via the inverter 30, a DC/DC converter, or the like. The front motor 2 and the rear motor 5 can carry out regenerative power generation during deceleration of the vehicle. The regenerated electrical power can be stored in the high-voltage battery 8. The low-voltage battery 7 stores electrical power to be supplied to various units (supplemental components), such as lamps and electronic control units of an air conditioner, the internal combustion engine 1, and the like.

An output shaft of the internal combustion engine 1 is mechanically connected to an input shaft of the generator 3 via a speed-increasing gear set inside the front gearbox 4. An output shaft of the front motor 2 is mechanically connected to the inner ends of a pair of drive shafts 10 via a speed-reducing gear set inside the front gearbox 4. The outer ends of the drive shafts 10 are mechanically connected to a front right wheel 11R and a front left wheel 11L, respectively. The gear of the speed-reducing gear set closest to the drive shaft 10 is a front differential gear that allows the rotational difference between the front right wheel 11R and the front left wheel 11L.

The speed-increasing gear set and the speed-reducing gear set described above are housed in a single front gearbox 4. However, there is no mechanical connection between the speed-increasing gear set and the speed-reducing gear set in the front gearbox 4. The front motor 2 and the generator 3 are fixed to the left portion of the front gearbox 4 via fastening bolts. On the other hand, an engine block 1B of the internal combustion engine 1 is fixed to the right portion of the front gearbox 4 via fastening bolts. The internal combustion engine 1 comprises, from the top down, a cam cover, a cylinder head that houses a valve system, a cylinder block that houses pistons, a crankcase that houses a crankshaft, and an oil pan, and is configured by means of a combination thereof. The engine block 1B is composed of a cylinder block and a crankcase (refer to FIGS. 2 and 6). In the internal combustion engine 1, the engine block 1B (including the pistons, connecting rods, and crankshaft) is the heaviest.

The internal combustion engine 1, the front motor 2, the generator 3, and the front gearbox 4 are integrated by the interconnecting of their respective housings via fastening bolts. This integrated unit is mounted on the front side member 12 and a front subframe (not shown). A front bumper reinforcement (not shown) that extends in the lateral direction is attached to the front end of the pair of front side members 12 via a crash box.

The drive shafts 10 are preferably formed to be of the same length insofar as possible. Therefore, the front gearbox 4 is arranged essentially at the center of the vehicle in the lateral direction. That is, as seen in a plan view, the front gearbox 4 is arranged so as to overlap with longitudinal center line L1. As a result, the front motor 2 (and the generator 3) is arranged on one side (left side of the vehicle) of longitudinal center line L1, and the internal combustion engine 1 is arranged on the other side (right side of the vehicle) of longitudinal center line L1. Thus, in the front section of the vehicle, the weight is equally distributed between the left and right sides.

Figure 3:
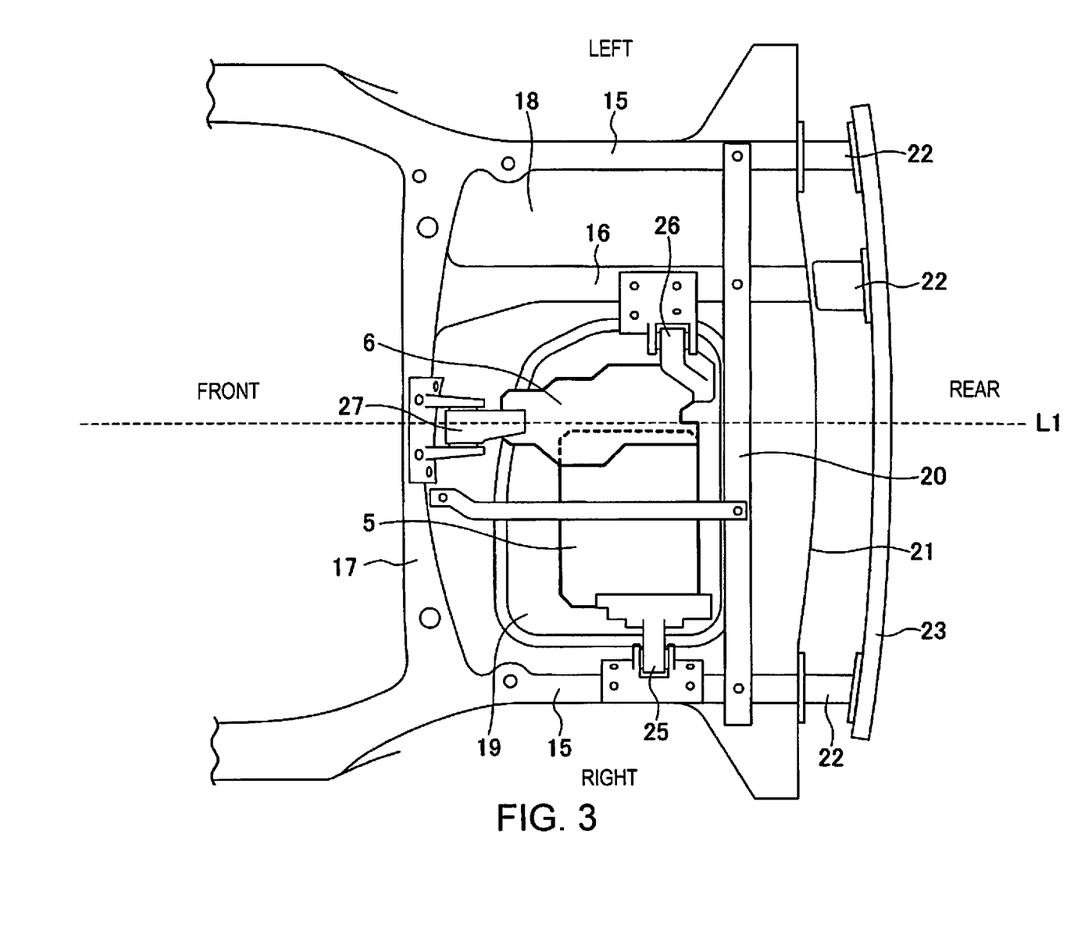
FIG. 3 is a bottom view of the rear section of the vehicle.

On the other hand, as shown in FIGS. 1 and 3, the output shaft of the rear motor 5, which is mounted in the rear section, is mechanically connected to the inner ends of a pair of drive shafts 13 via a speed-reducing gear set inside a rear gearbox 6. The outer ends of the drive shafts 13 are mechanically connected to a rear right wheel 14R and a rear left wheel 14L, respectively. The gear of the speed-reducing gear set closest to the drive shaft 13 is a rear differential gear that allows a rotational difference between the rear right wheel 14R and the rear left wheel 14L. The rear motor 5 is fixed to the right portion of the rear gearbox 6 via fastening bolts.

The rear motor 5 and the rear gearbox 6 are integrated by interconnecting the respective housings with fastening bolts. This integrated unit is mounted on one of a pair of rear side members 15, a parallel member 16 that is parallel to the rear side members 15, and a rear cross member 17 (refer to FIG. 3). The parallel member 16 is disposed between the pair of rear side members 15. The rear cross member 17 is connected at the front ends of the pair of rear side members 15 and of the parallel member 16. Moreover, the integrated rear motor 5 and rear gearbox 6 are located within an opening 19 formed in a floor panel 18 and projects above and below the floor panel 18 (see FIG. 5).

Further, the pair of rear side members 15 and the parallel member 16 are interconnected by a laterally extending sub-cross member 20 at portions slightly in front of the rear ends of these members. Further, the rearward ends of the pair of rear side members 15 extend to a rear end panel 21 and are respectively connected to crash boxes 22 via the rear end panel 21. A laterally extending rear bumper reinforcement 23 is attached to the rear ends of the crash boxes 22. The rear end panel 21 is also connected to the rear edge of the floor panel 18. The rear end of the parallel member 16 also extends to the rear end panel 21.

Figure 4:
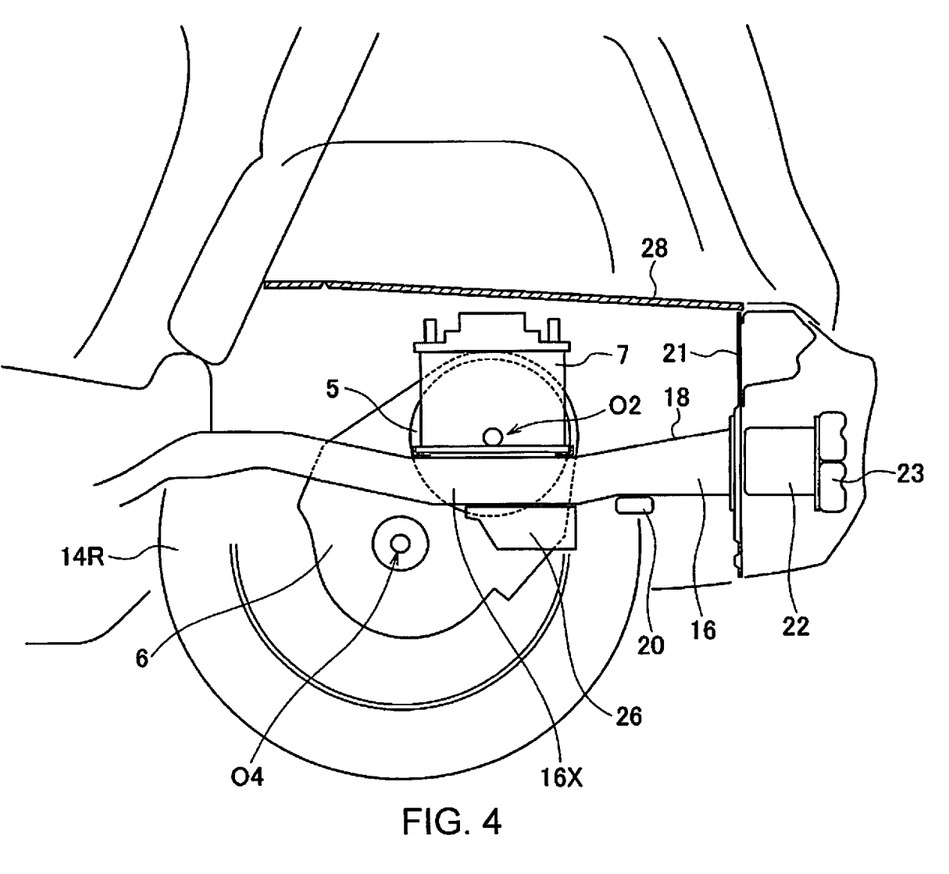
FIG. 4 is a side sectional view of the rear section of the vehicle.

A crash box 22 is also arranged between the rear end of the parallel member 16 and the rear bumper reinforcement 23. However, in the present embodiment, the front end of the crash box 22 between the parallel member 16 and the rear bumper reinforcement 23 does not come in contact with the rear end panel 21. As shown in FIG. 4, a small gap is formed between the front end of the crash box 22 and the rear end panel 21. The front end of this crash box 22 may however be joined to the rear end panel 21 in the same manner as for the other crash boxes 22.

Figure 5:
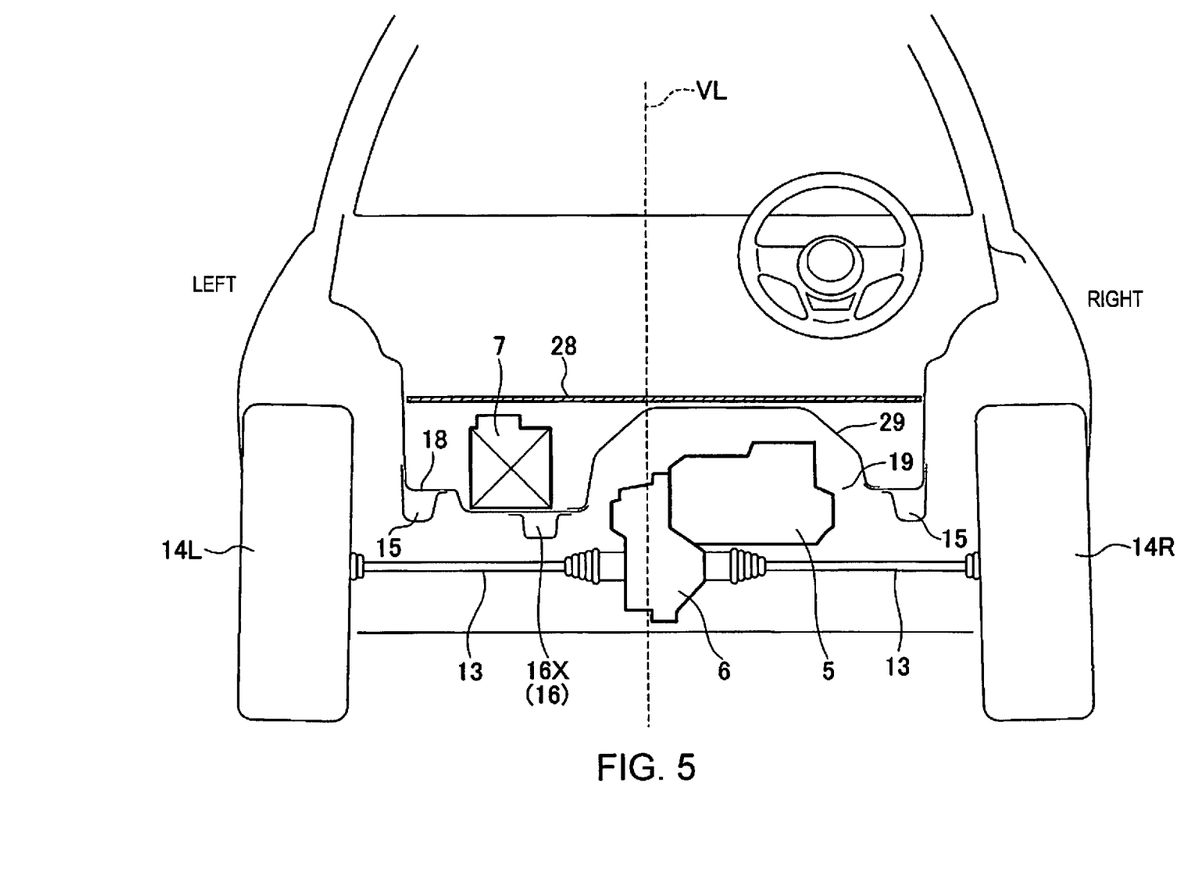
FIG. 5 is a schematic rear view of the vehicle.

As shown in FIG. 5, the rear side members 15 and the parallel member 16 (and the rear cross member 17) are each formed by welding a long member that has a hat-shaped cross section to the floor panel 18. That is, the rear side members 15 and the parallel member 16 (and the rear cross member 17) are formed as a skeletal structural member that has a closed rectangular cross section. In FIG. 1, the floor panel 18 is not shown to facilitate viewing of each part, and only long members that have hat-shaped cross sections are shown as the rear side members 15 and the parallel member 16. Further, in the present embodiment, the rear wheels 14R and 14L are suspended by a torsion beam type suspension. A torsion beam 24, shown in FIG. 1, is located beneath the rear cross member 17 (near side in the figure).

Further, the low-voltage battery 7, which is heavy but not of large volume, is positioned on the parallel member 16 on the side opposite to the rear motor 5 with respect to longitudinal center line L1. The low-voltage battery 7 is supported from below by the parallel member 16. The parallel member 16 is located on the rear gearbox 6 side. A bent portion 16X that is bent so as to partially project downward is formed in the central region of the parallel member 16 in the longitudinal direction. The low-voltage battery 7 is placed on this bent portion 16X. Therefore, the amount of upward projection of the low-voltage battery 7 is suppressed, and, as shown in FIGS. 4 and 5, it is possible to make bottom plate 28 of the luggage compartment flat. As a result, it is possible to improve the usability of the luggage compartment while ensuring the capacity of the luggage compartment. As shown in FIG. 5, the rear motor 5 and the rear gearbox 6 which protrude above the floor panel 18 through the opening 19 are covered by a dome-shaped lid 29 that is attached to the floor panel 18 to as to close the opening 19.

In other words, the rear motor 5 described above is arranged in (the opening 19 formed in) an area surrounded by one of the rear side members 15, the parallel member 16, and the rear cross member 17 (and the sub-cross member 20) in a plan view. The rear motor 5 is mounted on one of the rear side members 15 via a right mount 25. Further, the rear motor 5 is also mounted on the parallel member 16 via the rear gearbox 6 and a left mount 26. Further, the rear motor 5 is also mounted on the rear cross member 17 via the rear gearbox 6 and a front mount 27.

Further, drive shafts 13 of the rear section are preferably formed to be of the same length insofar as possible, in the same manner as the drive shafts 10 of the front section. Thus, the rear gearbox 6 is arranged essentially at the center of the vehicle in the lateral direction. That is, in a plan view, the rear gearbox 6 is arranged so as to overlap longitudinal center line L1. As a result, the rear motor 5 is arranged on the other side (right side of the vehicle) of longitudinal center line L1, that is, on the side opposite to the front motor 2, and the low-voltage battery 7 is arranged on one side (left side of the vehicle) of longitudinal center line L1. Thus, in the rear section of the vehicle as well, the weight is equally distributed between the left and right sides.

The distance between the rear motor 5 and longitudinal center line L1 is set shorter than the distance between the low-voltage battery 7 and longitudinal center line L1. The weight of the rear motor 5 is usually greater than that of the low-voltage battery 7. Thus, the heavy rear motor 5 is brought close to longitudinal center line L1, and the distance between the low-voltage battery 7 longitudinal center line L1 is made long in order to balance the moment of inertia that acts when the vehicle rolls. In other words, it is possible to tune the vehicle dynamics by means of the installation position of the low-voltage battery 7, which has greater mounting flexibility than the rear motor 5.

Figure 2:
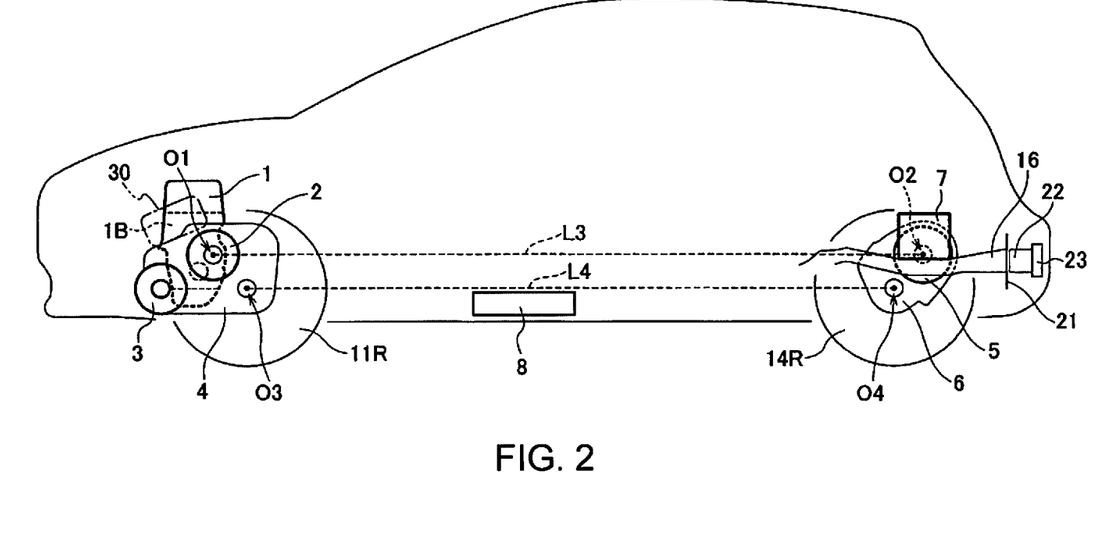
FIG. 2 is a schematic side view of the vehicle.
Figure 6:
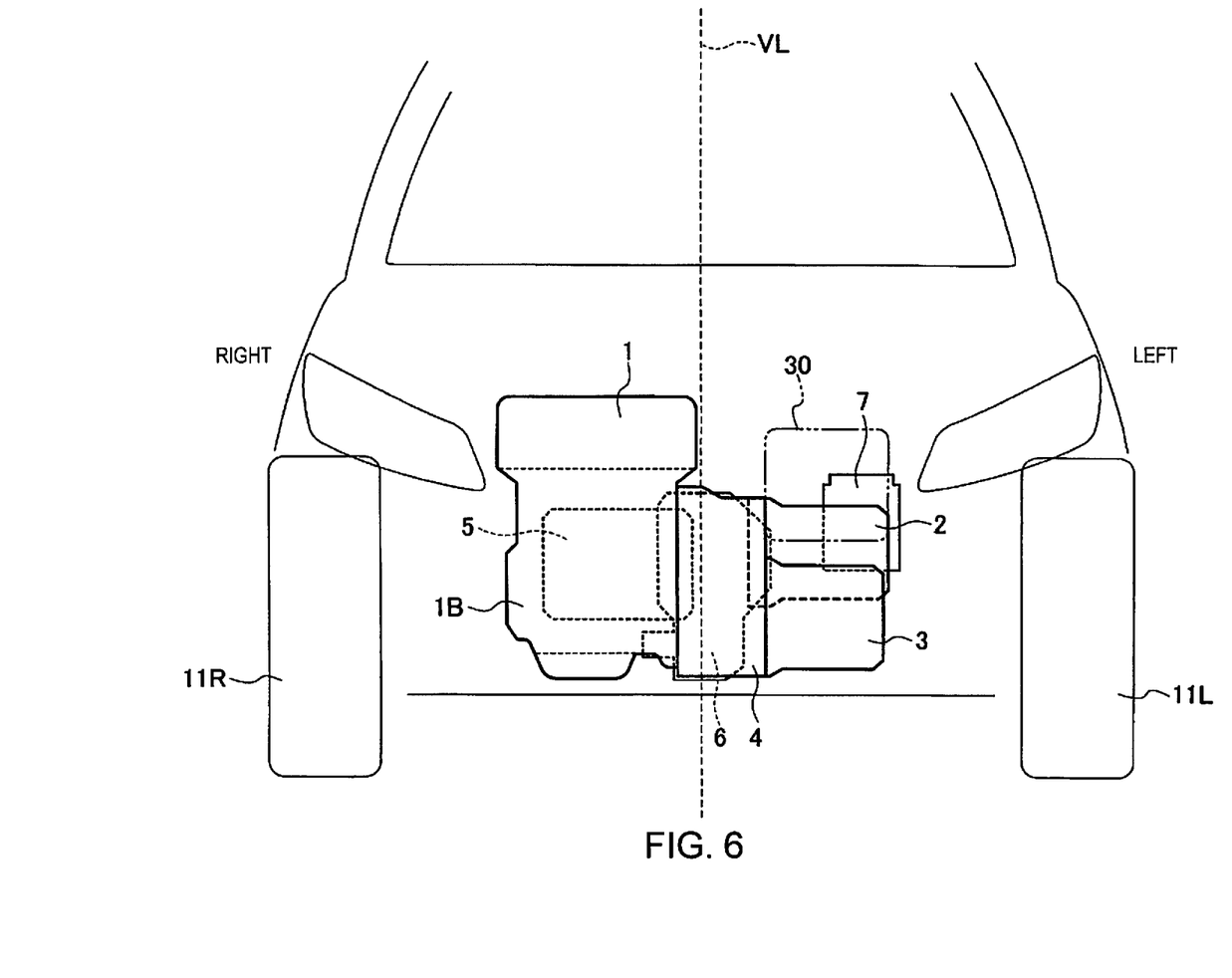
FIG. 6 is a schematic front view of the vehicle.

Further, as shown in FIG. 2, when the vehicle is viewed from the side, the front motor 2 and the engine block 1B of the internal combustion engine 1 overlap with one another at least partially. Further, both the rear motor 5 and the low-voltage battery 7 overlap one another at least partially. Further, as shown in FIG. 6, when the vehicle is viewed from the front, the front motor 2 and the low-voltage battery 7 overlap with one another at least partially. Further, the rear motor 5 and the engine block 1B overlap with one another at least partially. That is, the front motor 2, the internal combustion engine 1 (engine block 1B), the rear motor 5, and the low-voltage battery 7, which are heavy and are mounted in the front or rear section, far from the center of gravity of the vehicle, are arranged toward the front, rear, left, and right of the vehicle in a well-balanced manner, thereby improving the weight distribution.

Further, as shown in FIG. 2, in a side view of the vehicle, the line that passes through the center of the output shaft O1 of the front motor 2 and the center of the output shaft O2 of the rear motor 5 is referred to as motor passage line L3. Similarly, the line that passes through the mounting center O3 of the drive shaft 10 to the front gearbox 4 and the mounting center O4 of the drive shaft 13 to the rear gearbox 6 is referred to as differential gear passage line L4. Here, motor passage line L3 and differential gear passage line L4 are parallel to each other. In other words, the front motor 2, the rear motor 5, the front gearbox 4 (drive shaft 10) and the rear gearbox 6 (drive shaft 13) are mounted such that motor passage line L3 and differential gear passage line L4 become parallel to each other. "Parallel" here means not only the precisely parallel case (wherein motor passage line L3 and differential gear passage line L4 do not intersect at all) but also the essentially parallel case, in which the angle of intersection is less than or equal to 0.5°.

Further, the high-voltage battery 8 is arranged below differential gear passage line L4. The positions of the respective mounting centers O3 and O4 of the drive shafts 10 and 13 are lower than the positions of the respective output shafts O1 and O2 of the front motor 2 and the rear motor 5. That is, differential gear passage line L4 is lower than motor passage line L3. As described above, the heavy high-voltage battery 8 overlaps the intersection S in a plan view, and thus is arranged in the vicinity of the center of gravity of the vehicle. Further, the heavy high-voltage battery 8 is arranged below differential gear passage line L4. That is, the high-voltage battery 8 further lowers the position of the center of gravity of the vehicle in side view, thereby improving the vehicle dynamics.

According to the present embodiment, in a plan view of the vehicle, the intersection S of longitudinal center line L1 and lateral center line L2 overlap the high-voltage battery 8. Further, in a plan view, the front motor 2 and the low-voltage battery 7 arranged in the rear section are arranged on one side (left side in the present embodiment) of longitudinal center line L1, and the internal combustion engine 1 arranged in the front section and the rear motor 5 are arranged on the other side (right side in the present embodiment) of longitudinal center line L1. Therefore, the heavy high-voltage battery 8 is arranged essentially at the center of the vehicle, thereby not biasing the weight distribution. Further, the heavy units, that is, the internal combustion engine 1, the front motor 2, the rear motor 5, and the low-voltage battery 7 are respectively arranged on one side of the front section, the other side of the front section, one side of the rear section, and the other side of the rear section. As a result, the weight is equally distributed, thereby achieving an excellent weight distribution. By means of the excellent weight distribution, the dynamic performance of the vehicle (handling and stability) can be improved.

Further, in the present embodiment the rear motor 5 is arranged in an area surrounded by one of the rear side members 15, the parallel member 16, and the rear cross member 17 in a plan view, and is mounted thereto. Therefore, by mounting the rear motor 5 not only on the parallel member 16 provided parallel to the rear side members 15, but also on the pair of rear side members 15, the rear motor 5 can be reliably arranged on the other side of longitudinal center line L1 (right side in the present embodiment). As a result, in addition to the low-voltage battery 7, the parallel member 16 also is arranged on one side of longitudinal center line L1 (left side in the present embodiment) in the rear section; therefore the weight is equally distributed between one side and the other side, thereby realizing an excellent weight distribution.

Further, in the present embodiment, differential gear passage line L4 is parallel to motor passage line L3, and the high-voltage battery 8 is arranged below differential gear passage line L4. The drive shafts 10 and 13, which drive the wheels (11L/R and 14L/R) are arranged at essentially the same height with respect to the ground, even if the drive shafts are not horizontal thereto. That is, the mounting centers O3 and O4 of the drive shafts 10 and 13 are also at essentially the same height, and differential gear passage line L4 is essentially horizontal. Since the output shafts O1 and O2 of the front motor 2 and the rear motor 5 exist on motor passage line L3 parallel to differential gear passage line L4, the height of the heavy front motor 2 on one side and of the heavy rear motor 5 on the other side are essentially equal, and the attitude of the vehicle during rolling motion is stabilized. Attitude stabilization improves the turning performance (included in vehicle dynamics). Further, disposing the heavy high-voltage battery 8 below differential gear passage line L4 lowers the center of gravity of the vehicle, thereby improving vehicle dynamics.

Further, in the present embodiment, the center of the parallel member 16 in the longitudinal direction is bent to project downward and form the bent portion 16X, and the low-voltage battery 7 is placed on this bent portion 16X. Therefore, the heavy low-voltage battery 7, on which the force of inertia acts, can be firmly held on the parallel member 16. Further, since the low-voltage battery 7 is placed on the bent portion 16X that projects downward, the amount of upward projection of the low-voltage battery 7 is suppressed, and, as shown in FIGS. 4 and 5, it is possible to make the bottom plate 28 of the luggage compartment flat. As a result, it is possible to improve the usability of the luggage compartment while ensuring the capacity of the luggage compartment. Further, the bent portion 16X is only formed in part of the parallel member 16, and the rear end thereof is at the same height as the pair of rear side members 15, and thus receives the load at the time of a rear collision together with the rear side members 15.

Further, in the present embodiment, in a lateral view, the front motor 2 and the engine block 1B of the internal combustion engine 1 overlap with one another at least partially, and the rear motor 5 and the low-voltage battery 7 overlap with one another at least partially. At the same time, in a front view, the front motor 2 and the low-voltage battery 7 overlap with one another at least partially, and the rear motor 5 and the engine block 1B overlap with one another at least partially. In other words, the internal combustion engine 1 (the engine block 1B, which is the heavy part), the front motor 2, the rear motor 5, and the low-voltage battery 7 are installed so as to be located at the respective apices of a rectangle in a plan view, and the respective mounting heights are essentially equal. Therefore, the weight is further equally distributed, thereby realizing a more uniform distribution. Further, because all of these mounting heights are essentially equal, the attitude of the vehicle is better stabilized during rolling motion. A more uniform weight distribution and greater attitude stability during rolling further improve vehicle dynamics.

The present invention is not limited to the embodiment described above. For example, the vehicle in the embodiment described above is a series hybrid vehicle, but the vehicle may be a parallel hybrid vehicle, or a mixed series/parallel hybrid vehicle. That is, the output of the mounted internal combustion engine may be used only for power generation, only for running the vehicle, or for both power generation and running the vehicle.

The invention claimed is:

1. An installation arrangement of a drive motor and a battery in a vehicle, comprising:
    a front motor for driving a front wheel;
    a rear motor for driving a rear wheel;
    an internal combustion engine;
    a high-voltage battery that stores electrical power for the front motor and the rear motor; and
    a low-voltage battery that stores electrical power used for various units mounted in the vehicle,
    the vehicle including a longitudinal center line extending along a longitudinal direction of the vehicle passing through a center of the vehicle with respect to a lateral direction of the vehicle, and a lateral center line extending along the lateral direction that passes through the center of the vehicle with respect to the longitudinal direction such that an intersection of the longitudinal center line and the lateral center line overlaps the high-voltage battery,
    the front motor is arranged on one side of the longitudinal center line in a front section of the vehicle that is in front of the lateral center line, and the internal combustion engine is arranged on the other side of the longitudinal center line in the front section of the vehicle, and
    the low-voltage battery is arranged on one side of the longitudinal center line in a rear section of the vehicle that is behind the lateral center line, and the rear motor is arranged on the other side of the longitudinal center line in the rear section of the vehicle.

2. The installation arrangement according to claim 1, further comprising
    a pair of rear side members that extend in the longitudinal direction,
    a parallel member that extends in the longitudinal direction and that is disposed between the pair of rear side members, and
    a rear cross member that connects the front ends of the pair of rear side members and the parallel member,
    the rear motor being disposed in an area surrounded by one of the rear side members, the parallel member, and the rear cross member in a plan view, and
    the rear motor being mounted on the one of the rear side members, the parallel member, and the rear cross member.

3. The installation arrangement according to claim 2, wherein
    a center of the parallel member in the longitudinal direction is bent so as to project downward, and
    the low-voltage battery is placed on a bent portion of the parallel member.

4. The installation arrangement according to claim 1, further comprising
    a front gearbox that mechanically connects an output shaft of the front motor and a drive shaft of the front wheel, and
    a rear gearbox that mechanically connects an output shaft of the rear motor and a drive shaft of the rear wheel,
    a differential gear passage line passing through a mounting center of the drive shaft to the front gearbox and a mounting center of the drive shaft to the rear gearbox being parallel to a motor passage line passing through a center of the output shaft of the front motor and a center of the output shaft of the rear motor as viewed from a side view of the vehicle, and the high-voltage battery being disposed below the motor passage line.

5. The installation arrangement according to claim 1, wherein the front motor and an engine block of the internal combustion engine at least partially overlap one another as viewed from a side view of the vehicle, and the rear motor and the low-voltage battery at least partially overlap one another as viewed from the side view of the vehicle, and the front motor and the low-voltage battery at least partially overlap one another as viewed from a front view of the vehicle, and the rear motor and the engine block at least partially overlap one another as viewed from a front view of the vehicle.

\* \* \* \* \*